Dec. 30, 1924.

E. NIZAMIS

AUTOMOBILE SIGNAL

Filed April 9, 1924

1,520,961

Inventor

E. Nizamis

By Clarence A. O'Brien

Attorney

Patented Dec. 30, 1924.

1,520,961

UNITED STATES PATENT OFFICE.

EFTHIMIOS NIZAMIS, OF KALAMAZOO, MICHIGAN.

AUTOMOBILE SIGNAL.

Application filed April 9, 1924. Serial No. 705,357.

*To all whom it may concern:*

Be it known that I, EFTHIMIOS NIZAMIS, a citizen of Greece, residing at Kalamazoo, in the county of Kalamazoo and State of Michigan, have invented certain new and useful Improvements in an Automobile Signal, of which the following is a specification.

This invention relates to new and useful improvements in automobile direction indicators and has for its principal object to provide a simple and efficient device which may be easily and quickly moved to an operative indicating position whenever desired.

A further object of the invention is to provide an automobile signal of the above mentioned character, wherein means is provided for operating the same within easy access to the operator of the vehicle, thus obviating the necessity of the operator of having to place his hand outside of the car in order to give the desired signal.

A still further object of the invention is to provide an automobile signal of the above mentioned character, wherein means is provided for automatically returning the signal to its normal inoperative position after the operator has actuated the signal.

A still further object is to provide a device of the above mentioned character, wherein the indicating means is of such a construction as to be readily visible at night as well as in the daytime, the device being simple in construction, inexpensive, strong and durable and furthermore adapted for the purposes for which it is designated.

Other objects and advantages of this invention will become apparent during the course of the following description.

Figure 1:
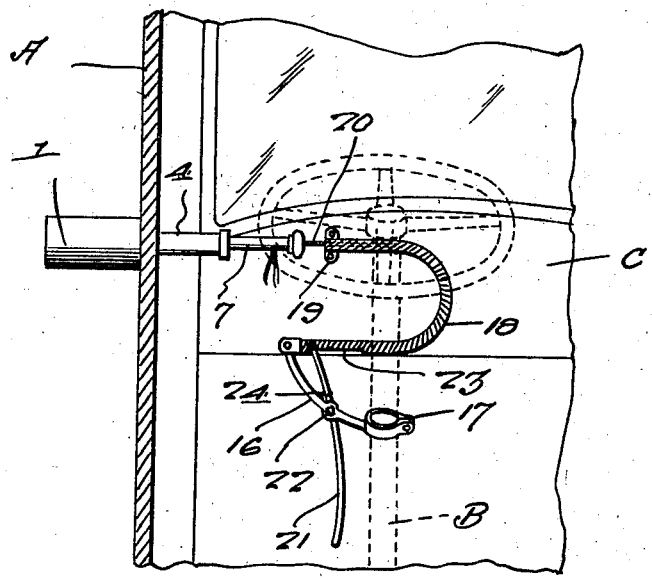
Figure 2:
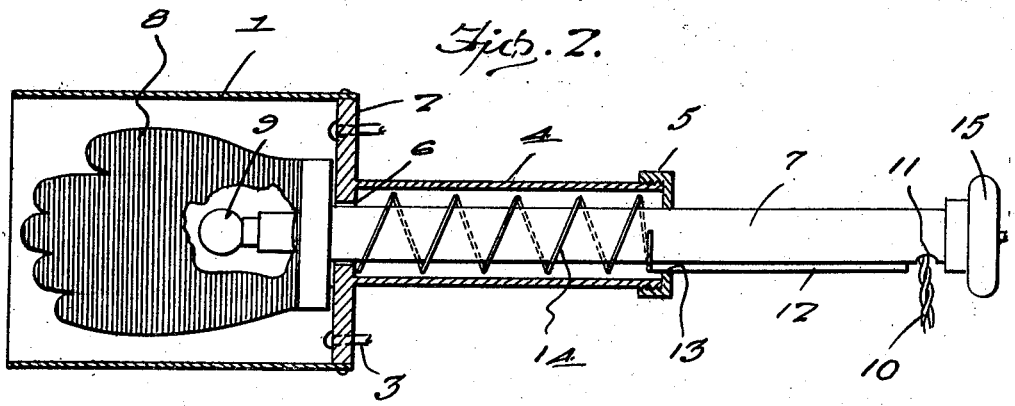

In the accompanying drawing forming a part of this specification and in which like numerals designate like parts throughout the same:

Figure 1 is a side elevation of my invention showing the same in position on a motor vehicle body and in an inoperative position, and Figure 2 is an enlarged side elevation of my signal arm showing the same disposed within the casing.

In the drawing wherein for the purpose of illustration is shown the preferred embodiment of my invention, the numeral 1 designates a casing, the outer end of which is open, the inner end being secured to a plate or the like shown at 2. The plate is adapted to be secured to the outside of the body of the vehicle A by any suitable fastening means such as is shown at 3. The plate 2 is provided with an inwardly extending tubular extension 4 and the outer end thereof is threaded to receive thereon the threaded cap 5.

Extending longitudinally through the tubular extension 4 and through a suitable opening 6 provided in the plate 2 is the elongated tubular arm 7. The outer end of the arm 7 supports thereon the indicating member 8 which in the present instance is in the form of a hand and may be formed of any suitable material such as celluloid or the like, although it is to be understood that any other suitable material may be substituted therefor. The tubular arm 7 furthermore carries on its inner end the lamp 9 which is disposed within the indicating member 8 and any suitable source of supply means may be provided for illuminating the lamp 9 through the medium of the electric cord 10 which extends through an opening 11 provided in the inner end of the tubular arm 7 and is disposed therein. The purpose of providing the lamp 9 is to provide a means whereby the signal or indicator 8 may be illuminated at night so as to render the same visible when in operation.

The inner portion of the tubular arm 7 is provided with a longitudinally extending rib or key 12 and the same is adapted to cooperate with a suitable slot 13 provided in the cap 5 whereby rotary movement of the tubular arm 7 within the tubular extension 4 will be prevented when the arm is moved outwardly so as to dispose the signal or indicator 8 in an indicating position beyond the outer open end of the casing 1. For the purpose of normally holding the signal member or indicating member 8 in an inoperative position within the casing 1, I provide a suitable coil spring 14 which encircles the outer end of the tubular arm 7 and is disposed between the plate 2 and the rib or key 12 in the manner clearly illustrated in Figure 2 of the drawing. The extreme inner end of the tubular arm 7 carries thereon the head 15 and to which is secured the actuating means hereinafter to be more fully described.

The actuating means for moving the signal member 8 outwardly from the casing 1 to an indicating position comprises a supporting arm 16 which is clamped around the steering column B of the vehicle shown at 17 in Figure 1 of the drawing. The upper end of the supporting arm 16 is connected to one end of a suitable housing 18 which is formed of flexible wire and the opposite end of the housing 18 is fastened to the instrument board C in the manner shown at 19. Extending through the flexible housing 18 is a flexible actuating cord 20, one end of which is fastened to the head 15 on the inner end of the tubular arm 7 in any suitable manner while the opposite end is fastened to the upper end of a suitable lever 21 which is pivotally supported intermediate its end as shown at 22 on the supporting arm 16. The upper end of the lever 21 is disposed in a suitable cut out portion 23 provided in the lower end of the housing 18 in the manner clearly illustrated so as to provide a means whereby the lever may properly function in operating the cable 20. A suitable spring such as is shown at 24 is associated with the lever and the supporting arm for normally holding the lever in a retracted or inoperative position.

The operation of my automobile signal may be briefly stated as follows: Normally the signalling member 8 is disposed within the casing 1 and the lever 21 is arranged in the manner as shown in Figure 1. When the operator of the vehicle is desirous of making a turn or wishes to stop the vehicle, he grasps the lower end of the lever 21, moves the same upwardly so as to cause an inward movement of the upper end of the lever and this results in the cable 20 exerting an outward pressure on the head 15 of the tubular arm 7. The tubular arm 7 is moved outwardly against the tension of the coil spring 14 causing the signal member 8 carried on the outer end thereof to move outwardly from the open end of the casing 1 and be disposed in an indicating position whereby the same may be visible by the automobile drivers in the rear of the vehicle upon which the signal is mounted.

After the vehicle upon which the signal is mounted has made the desired turn or has stopped, the operator releases the lever 21, the spring 24 causing the return of the upper end of the lever and the flexible cable 20, and the coil spring 14 further causing the signal member to be retracted and moved back to its normal position within the casing 1.

By providing an automobile signal of the above mentioned character, the simplicity of the same enables an operator of the vehicle to actuate the signal whenever desired without having to release both hands from the steering wheel, the parts being within easy access to the operator. Furthermore, the provision of a signal of the above mentioned character, will obviate the necessity of the driver having to place his hand outside of the car when desirous of making a turn or wishing to stop the car as is now frequently done. The simplicity of my device furthermore enables the same to be placed upon a vehicle without interfering with the operating parts thereon and furthermore will at all times be in a position to be actuated by the operator of the vehicle. An automobile signal of the above mentioned character may be manufactured at a very low cost and will further be strong and durable and positive in its operation.

While I have shown the preferred embodiment of my invention, it is to be understood that various changes in the size, shape and arrangement of parts may be resorted to without departing from the spirit of the invention and the scope of the appended claim.

Having thus described my invention, what I claim is:—

A signal operating device comprising an arm having means for attachment to a fixed support, a lever pivoted at a point between its ends to the arm at a point between the ends thereof, a flexible housing provided at its side with a slot, and pivotally connected at one end with the arm, a flexible element slidably mounted in the housing and connected at one end with the lever at the slot of the housing, spring means for holding the element at a normal position, means for securing the free end of the housing at a fixed point, and a signal connected with the flexible element.

In testimony whereof I affix my signature.

EFTHIMIOS NIZAMIS.